United States Patent Office 3,041,330
Patented June 26, 1962

3,041,330
CELLULOSIC DERIVATIVES OF TRIAZINYLBENZOPHENONES
Ralph Arthur Coleman, Middlesex, Frank Joseph Arthen and Jerry Peter Milionis, South Bound Brook, and Warren Schumann Forster, Basking Ridge, N.J., assignors to American Cyanamid Company, New York, N.Y., a corporation of Maine
No Drawing. Filed June 29, 1960, Ser. No. 39,424
6 Claims. (Cl. 260—231)

This invention relates to cellulose esterified with triazine derivatives of benzophenones. More specifically, it relates to cellulose esterified by compounds of the formula

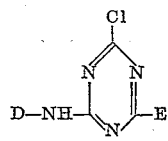

in which D is the structure

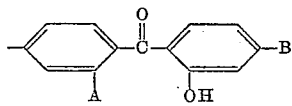

wherein A may be hydrogen or hydroxyl and B may be hydrogen, lower alkyl, alkoxy, chlorine or bromine, and E may be chlorine, the group —NHD wherein D is defined as above, sulfoalkylamino or carboxyalkylamino. More specifically also, it relates to cellulose having at least 0.01% of the total free hydroxyl groups esterified by the triazinyl benzophenones of the above formula. Such cellulose has a minimum of 0.1% of its weight as UV absorber.

It has been demonstrated that ultraviolet light has a tendency to cause the deterioration of cellulose, whether in the form of sheets of regenerated cellulose or in the form of natural or regenerated fibers. This has been shown by protecting the fibers with ultraviolet light absorbing screens and measuring the decrease in deterioration upon exposure of ultraviolet light. Means have therefore been sought to protect the fibers by the utilization of ultraviolet absorbing compounds. One way suggested is to incorporate ultraviolet absorbing compounds in resin latices and use these latices in the resin treatment of the fibers. Since the absorbing power of films decreases as they become thinner, this has proved to be a very inefficient method because a film of the thickness which can be tolerated on the fiber screens out only a very small amount of ultraviolet radiation.

We have found a much more satisfactory solution to this problem in that we have devised a way of making the benzophenone ultraviolet light absorber an integral part of the cellulose molecule. We achieve this object by esterifying the hydroxyls of the cellulose molecule a minimum of .01% of the hydroxyls being esterified with a class of chlorotriazinylaminobenzophenones claimed in our copending application, Serial No. 819,537, filed June 11, 1959. We have further found a new class of aminobenzophenone intermediates which are intermediates in the preparation of the triazonylaminobenzophenones of our invention and which are also, in their own right, intermediates for the incorporation of ultraviolet absorbing compounds in other polymeric materials. Such compounds are claimed in our parent copending application, Serial No. 819,537, filed June 11, 1959.

*Aminobenzophenone Derivative*

The aminobenzophenone starting materials for our invention are characterized by the formula

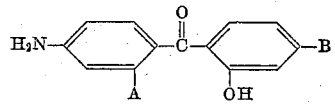

in which A may be hydrogen or hydroxyl and in which B may be hydrogen, alkyl, alkoxy or halogen.

These compounds are prepared by reacting a paranitrobenzoyl chloride with the properly substituted anisole in the presence of aluminum chloride and simultaneously dimethylating the resulting intermediate by heating. There is thus formed the 4-nitrobenzophenone which can be readily reduced to form the corresponding 4-aminobenzophenone. This preparation can be illustrated by the following schematic equation in which A and B have the same meaning as above.

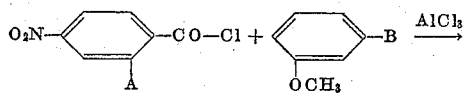

Since A can be hydrogen or hydroxyl, the benzoyl chloride starting material may be 4-nitrobenzoyl chloride or 4-nitrosalicyloyl chloride.

The other reagent can be meta or para halogen, alkoxy or alkyl derivatives of anisole. In the case of a meta-alkoxy anisole (that is a dialkyl resorcinol), only the alkoxy which is ortho to the carbonyl is dealkylated in the preparation of our invention under conditions used. Thus for example, 4-nitrobenzoyl chloride and meta-dimethoxybenzene when reacted in mono-chlorobenzene solution in the presence of aluminum chloride and the reaction mixture subsequently is heated form 4'-nitro-2-hydroxy-4-methoxy-benzophenone.

Other alkoxybenzenes which may be used include m-dimethoxybenzene, m-diethoxybenzene, m-chloranisole, m-bromoanisole, m-methylanisole, m-propylanisole and the like.

An alternative synthesis for these compounds is to prepare 4-nitro di- or trihydroxybenzophenones and alkylate the hydroxy not ortho to the carbonyl. Thus either p-nitrobenzoic acid or p-nitrosalicylic acid can be condensed with resorcinol in the presence of boron-trifluoride. Alkylation of the resulting 4'-nitro-2,4-dihydroxybenzophenone or 4'-nitro-2,2',4-trihydroxybenzophenone with an alkylating agent results in the 4-alkoxy compound, e.g.

$$O_2N-\!\!\left\langle\rule{0pt}{8pt}\right\rangle\!\!-COOH\ +\ \left\langle\rule{0pt}{8pt}\right\rangle\!\!-OH\ \longrightarrow$$

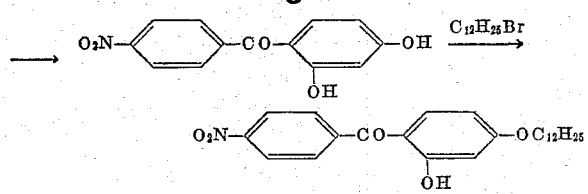

The nitro group can now be reduced to give the amino compound. Alkylating agents which can be used include diethylsulfate, butyl bromide, isobutyl bromide, octyl bromide, isooctyl bromide, lauryl bromide and octadecyl bromide, as well as the butyl, lauryl, hexadecyl, or octadecyl esters of p-toluene sulfonic acid. It is generally preferable to prepare the 4- or 5-alkoxybenzophenones with alkyls above methyl by this route.

Reduction of the nitro compound gives the 4'-amino-2-hydroxybenzophenones of the general formula given above. This reduction can be carried out in any known way, either catalytically or with reducing agents such as sodium sulfide, iron and acetic acid and the like. Catalytic reduction is carried out usually over palladium on charcoal.

These aminobenzophenones are claimed in our parent application. They are useful, as will be described, in the preparation of the triazinylaminobenzophenones of our invention and thus eventually of the esterified cellulose claimed herein.

The chlorotriazinylaminobenzophenones of the formula

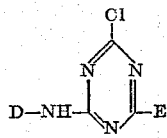

in which D represents the structure

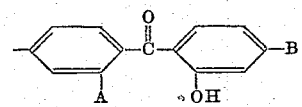

wherein A and B have the same meaning as defined above and E represents either chlorine, the group —NHD, sulfoalkylamino or carboxyalkylamino are formed by the reaction of cyanuric chloride with the aminohydroxybenzophenones described above. For example, cyanuric chloride and 4'-amino-2-hydroxybenzophenone react in acetone at room temperature to form a mixture of 2,4-dichloro-6-[4-(2-hydroxy-4-methoxybenzoyl)anilino] - s - triazine and 2-chloro-4,6-bis[4-(2-hydroxy - 4 - methoxybenzoyl) anilino]-s-triazine. These two compounds are easily separable by fractional crystallization. If the reaction is carried out at lower temperatures the product is almost exclusively the 2,4-dichloro derivative. At higher temperatures and with an excess of the aminohydroxybenzophenone a good yield of the bis-anilino triazine is obtained. The other aminobenzophenones discussed under that topic above can similarly be used. Such aminobenzophenones include 4'-amino-2-hydroxy - 4 - ethoxybenzophenone, 4'-amino-2,2'-dihydroxybenzophenone, 4'-amino-2,2' - dihydroxy-4-methoxybenzophenone, 4'-amino-2 - hydroxy - 4 - chlorobenzophenone, 4'-amino-2,2'-dihydroxy-4 - chlorobenzophenone and the like, as well as the other variations and permutations permissible in the aminohydroxybenzophenone as defined above. In each case either one or two chlorines of the cyanuric chloride can be replaced by an aminohydroxybenzophenone.

The dichlorotriazinylaminobenzophenone compounds may be further modified by reaction with one mol of an aminoalkane sulfonic acid or an aminoalkyl carboxylic acid. Thus, for example, 2,4-dichloro-6-[4(2-hydroxy-4-methoxybenzoyl)anilino]-s-triazine can be reacted with taurine in an aqueous acetone alkaline medium under reflux to form 2-chloro-4(2 - sulfoethylamino)6[4(2 - hydroxy-4-methoxybenzoyl)anilino]-s - triazine. Similarly, other amino acids can be used in place of the taurine, such as glycine, alanine, serine, 3-aminopropionic acid, 3-aminopropanesulfonic acid, 4-aminobutanesulfonic acid and the like. The chlorotriazinylaminobenzophenones of our invention, which also have, as a second substituent on the triazine ring, an aminoalkyl acid of this nature, are more easily applied to fibers and give better results. Consequently, they are a preferred species.

The chlorotriazinylhydroxybenzophenone compounds can be applied to cellulosic materials to yield a product protected against the deteriorating effect of ultraviolet light. They can be applied like any dyestuff, especially those modifications having a carboxyalkylamino or sulfoalkylamino substituent on the triazine ring. The cellulosic materials may be dyed later or they may be dyed before being treated with the chlorotriazinehydroxybenzophenones of this invention. In some cases the dyestuff and the benzophenone compound may be applied simultaneously. In each case a material is obtained which has a high capacity for absorbing ultraviolet light and which retains its capacity through repeated washing.

Modified Cellulose

The invention claimed herein is cellulose modified by having at least 0.01% of its free hydroxyl groups esterified with a chlorotriazinylaminobenzophenone of the above definition. While the chlorotriazinylaminobenzophenones described above can be used in many cases like ordinary dyes, when they are applied to the fiber in an alkaline medium it has been found that they are capable of reaction with the hydroxyls of the cellulose to form esters. These modified cellulose polymers form this embodiment of our invention. They are cellulose having as an integral part of its molecule a built-in ultraviolet light stabilizer. Such cellulose not only is more stable than ordinary cellulose but also the ultraviolet light stabilizer built into the cellulose molecule gives added protection to dyestuffs placed upon the fiber rendering them more light fast also.

The modified cellulose of our invention is obtained by treating cellulose with chlorotriazinylaminobenzophenones, of the types described above, in alkaline medium at elevated temperatures. The benzophenone derivative can be put on the cellulose in advance of the heating with alkali or simultaneously with this treatment. A minimum of 90° F. is needed to effect the chemical combination within a reasonable time. A more practical range is about 140–160° F. where desired reaction is complete in about 15 minutes. The alkali used may be a strong alkali (NaOH, KOH, LiOH, Ca(OH)$_2$) or a weaker acid binder (soda ash, potash and the like). Sufficient is used to neutralize all the hydrogen chloride which theoretically could be evolved from the benzophenone compound used and still keep the mixture alkaline.

At least 0.01% of the total hydroxyls in the cellulose molecule should be esterified to achieve effective protection against ultraviolet light.

The cellulose may be in the form of fibers or in the form of sheets. It may be natural cellulose or regenerated cellulose, it may be in the form of cotton, linen, hemp, jute, rayon, cellophane or the like.

Our invention can be illustrated by the following examples in which parts are by weight unless otherwise specified.

EXAMPLE 1

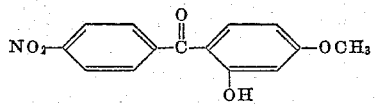

p-Nitrobenzoylchloride (90.8 parts), m-dimethoxybenzene (69 parts) and monochlorbenzene (333.2 parts) are mixed and cooled to 15° C. Aluminum chloride (84 parts) is added gradually while maintaining the temperature below 15° C. The mixture is then stirred at 10° for a short period. It is then gradually allowed to warm to 25° C. after which it is heated on a steam bath at 90° C. until the reaction is complete. The mixture is then drowned in ice water (700 parts) and the drowned mixture is heated on a steam bath to decompose the complex. It is then allowed to cool and the crystals which form are filtered off, recrystallized from a mixture of 1224 parts of alcohol and 219.75 parts of benzene, filtered and dried.

EXAMPLE 2

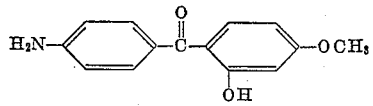

2-hydroxy-4-methoxy-4'-nitrobenzophenone (25 parts), glacial acetic acid (104.98 parts), and 10% palladium on charcoal (about 0.1 part) are placed in a hydrogenation autoclave. Hydrogen is run to 40 lb. pressure and the clave is shaken until a pressure drop of about twenty-three pounds occurs. The mixture is then heated on the steam bath, treated with acetone (79.2 parts), filtered, and the filtrate drowned in water (500 parts). The yellow solid which forms is filtered, washed with water, oven dried at 50° C. and recrystallized from alcohol to yield 4'-amino-2-hydroxy-4-methoxybenzophenone.

EXAMPLE 3

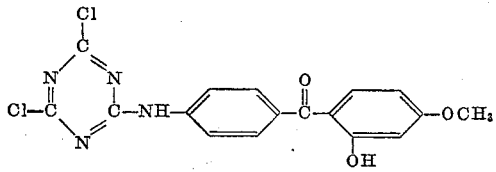

4'-amino - 2 - hydroxy - 4 - methoxybenzophenone (4.9 parts) (the product of Example 2) is dissolved in acetone (79.2 parts). Cyanuric chloride (3.7 parts) is dissolved in acetone (59.4 parts). Each solution is filtered. The cyanuric chloride solution is gradually added to the 4'-amino - 2 - hydroxy - 4 - methoxybenzophenone solution at room temperature. Stirring at room temperature is continued after addition is complete until the reaction is substantially complete. The solution is filtered. A small amount of solid material remains. The filtrate is cooled in an ice bath and the yellow crystalline solid is collected. This is the desired dichlorotriazine derivative.

EXAMPLE 4

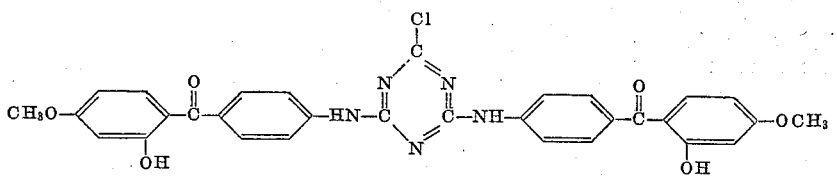

The procedure of Example 3 is followed except that twice the quantity of the 4'-amino-2-hydroxy-methoxybenzophenone is used and the acetone solution is heated to reflux until the reaction is substantially complete.

EXAMPLE 5

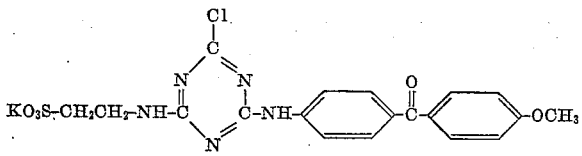

A mixture of the product of Example 3, 2,4-dichloro-6-[4-(2-hydroxy-4 - methoxybenzoyl)anilino] - s-triazine (4.5 parts), taurine (1.44 parts), potassium carbonate (1.59 parts), acetone (118.8 parts) and water (25 parts) is refluxed until the reaction is substantially complete. It is then filtered while warm. The filtrate is allowed to cool. The solid which forms is filtered and oven dried.

When glycine, alanine, serine or 3-aminopropionic acid are used in equivalent quantities in place of the taurine, the corresponding carboxyalkylaminotriazine derivatives are formed.

EXAMPLE 6

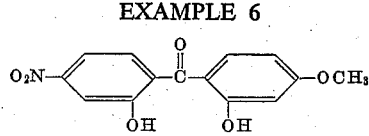

The procedure of Example 1 is repeated using an equivalent quantity of p-nitrosalicyloyl chloride in place of the p-nitrobenzoylchloride. The p-nitrosalicyloyl chloride may be prepared by heating p-nitrosalicylic acid with excess thionyl chloride using a small amount of pyridine as a catalyst.

EXAMPLE 7

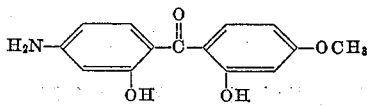

The procedure of Example 2 is followed using as starting material the product of Example 6.

EXAMPLE 8

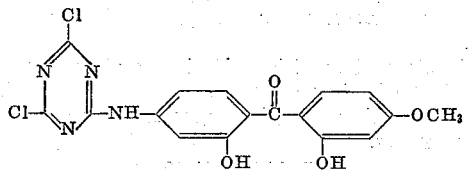

The procedure of Example 3 is followed using the product of Example 7 in place of the 4'-amino-2-hydroxy-4-methoxybenzophenone.

EXAMPLE 9

A sample of cellophane film (0.1734 gram) is placed in 50 ml. of a solution of 0.0259 gram of 2,4-dichloro-6-[4-(2-hydroxy-4-methoxybenzoyl)anilino]-s-triazine in acetone. After one half hour, 100 ml. of a developing solution (10 parts of soda ash and 60 parts of sodium chloride to 1000 parts of water) are poured into the acetone-cellophane bath. After one hour, the sample of cellophane is removed from the bath, rinsed, dried and tested spectrophotometrically. The sample shows an absorption peak at 333 mμ with an absorbancy of 0.312. The curve of a 0.0026% solution of 2,4-dichloro-6-[4-(2-hydroxy-4-methoxybenzoyl)amino]-s-triazine in acetone also showed an absorption peak at 333 mμ with an absorbancy of 0.996. This indicates that a wash-fast reaction product has been formed between the cellophane and the 2,4-dichloro-6-[4-(2-hydroxy-4-methoxybenzoyl)-anilino]-s-triazine when they are combined in an acetone-alkaline aqueous bath. Knowing that the cellophane is 0.023 centimeter thick and has a density of 1.45, the percent by weight of the triazine derivative on the cellophane is calculated to be about 0.02%.

Similar results are obtained when, in place of 2,4-dichloro - 6 - [4-(2-hydroxy-4-methoxybenzoyl)anilino]-s-triazine, there are used in equivalent amounts the various chlorotriazinylaminobenzophenones shown in Examples 4, 5, 8 and 14.

EXAMPLE 10

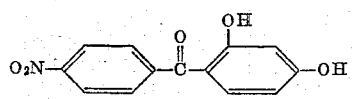

p-Nitrobenzoic acid (167 parts), resorcinol (110 parts), and monochlorobenzene (1000 parts) are slurried and heated to 50° C. Heating is discontinued and boron trifluoride (136 parts) is added. The temperature is raised to 90–100° C. and the mixture is stirred at this temperature until reaction is substantially complete. The mixture is drowned in a solution consisting of sodium acetate (200 parts) and water (1000 parts) and stirred a short while at 90–100° C. The solvent is removed by steam distillation. The residue is cooled and recrystallized from benzene.

EXAMPLE 11

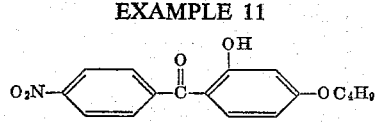

2,4-dihydroxy-4'-nitrobenzophenone (204 parts), butyl bromide (150 parts), sodium carbonate (53 parts), 95% alcohol (1000 parts) and water (300 parts) are stirred and refluxed until the reaction is substantially complete. The mixture is cooled and drowned in water. The solid which forms is filtered and recrystallized from 95% alcohol.

If, in place of butyl bromide in the above procedure, other alkyl bromides are used, e.g. octyl-, dodecyl-, and octadecyl bromides, one obtains the corresponding alkoxy benzophenones.

EXAMPLE 12

By reduction of the product of Example 11 using the procedure similar to that described in Example 2, 2-hydroxy-4-butoxy-4-aminobenzophenone is obtained.

Corresponding homologous products are obtained by a similar procedure.

EXAMPLE 13

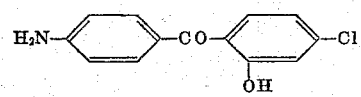

The procedure of Example 1 is followed using an equivalent quantity of m-chloranisole in place of the dimethoxybenzene. The product is reduced by the procedure of Example 2.

Similarly, the use of m-methylanisole and m-bromoanisole in this procedure results in the correspondingly substituted product.

EXAMPLE 14

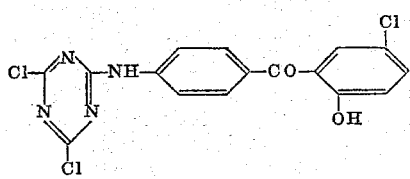

The procedure of Example 3 is followed, using an equivalent quantity of the product of Example 13 instead of that of Example 2.

EXAMPLE 15

The application of 2-chloro-4-(2-sulfoethylamino)-6-[4-(2-hydroxy-4-methoxybenzoyl)-anilino]-s-triazine to cotton consists of two steps, a padding and a fixing step. The padding solution is prepared by pasting 1 gram of the above compounds with 2 grams of a nonionic wetting agent consisting of polyoxyethylene esters of mixed fatty and resin acids complexed with urea and then diluting with 100 milliliters of water. Cotton cloth is passed through the padding solution and through a wringer to remove excess solution. The cloth is dried at room temperature. Analysis indicates 0.0185 gram of compound per gram of padded fabric.

The fixing or reacting of this compound on the padded cotton is obtained by immersing the cloth in a solution containing 50 milliliters of 30° Bé. caustic and 300 grams of sodium chloride per liter at 140 to 160° F. for 15 minutes. The fabric is then rinsed, soaped and dried. The amount of ultraviolet absorber reacted with the cotton is determined by analysis for sulfur and nitrogen, is found to be about 0.63%, equivalent to 0.125% of the free hydroxys. This is about 34% of the absorber originally padded on the cloth.

A piece of this treated cotton cloth is dyed with 0.25% of a yellow dye. An untreated cotton sample is dyed likewise. Exposure of both pieces of dyed cloth in a Fade-O-meter produced less fading of the treated yellow cloth.

Similar results are obtained when the products of Examples 4, 5, 8 and 14 are substituted in equivalent quantities for the s-triazine compound used in the above example.

We claim:

1. Cellulose having at least 0.01% of the total number of free hydroxyl groups present in the molecule esterified by compounds of the formula

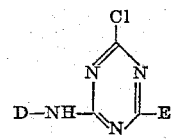

in which D is the structure of

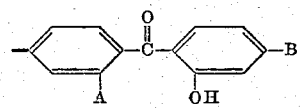

wherein A is selected from the group consisting of hydrogen and hydroxyl and B is selected from the group consisting of hydrogen, lower alkyl, alkoxy, chlorine and bromine, E being selected from the group consisting of chlorine, the group —NH—D in which D is as defined above, sulfoalkylamino and carboxyalkylamino.

2. The modified cellulose of claim 1 in which the esterifying compound is

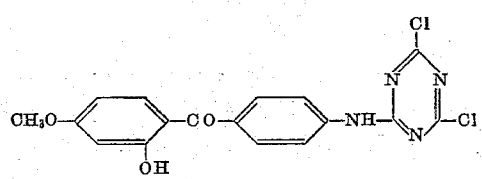

3. The modified cellulose of claim 1 in which the esterifying compound is

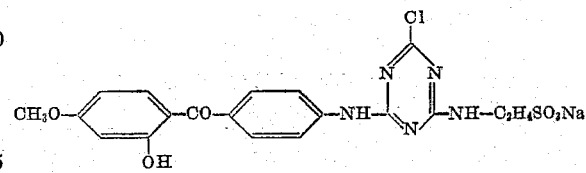

4. The modified cellulose of claim 1 in which the esterifying compound is
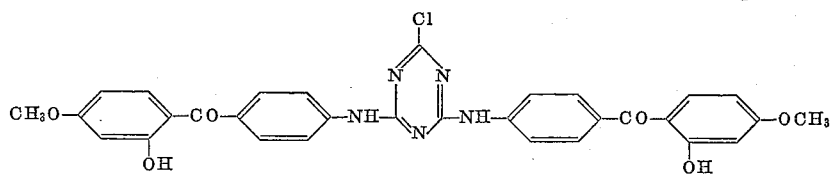
5. The modified cellulose of claim 1 in which the esterifying compound is
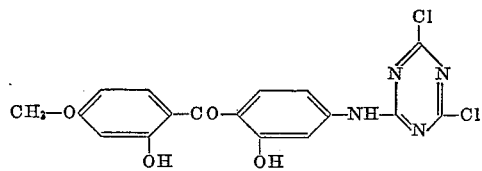
6. The modified cellulose of claim 1 in which the esterifying compound is
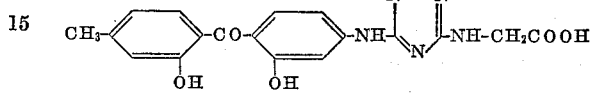
References Cited in the file of this patent
UNITED STATES PATENTS
| | | |
|---|---|---|
| 1,886,480 | Haller et al. | Nov. 8, 1932 |
| 2,332,047 | Bock et al. | Oct. 19, 1943 |
| 2,375,838 | Coolidge et al. | May 15, 1945 |

UNITED STATES PATENT OFFICE
CERTIFICATE OF CORRECTION

Patent No. 3,041,330            June 26, 1962

Ralph Arthur Coleman et al.

It is hereby certified that error appears in the above numbered patent requiring correction and that the said Letters Patent should read as corrected below.

Column 2, line 15, for "dimethylating" read -- demethylatii --; column 6, line 61, for "amino" read -- anilino --; column 8, line 1, for "compounds" read -- compound --; column 9, lines 11 to 17, the formula should appear as shown below instead of as in the patent:

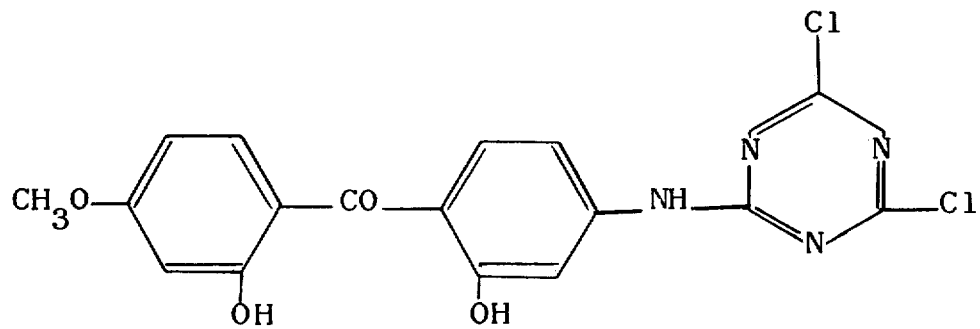

Signed and sealed this 16th day of April 1963.

(SEAL)
Attest:
ERNEST W. SWIDER
Attesting Officer

DAVID L. LADD
Commissioner of Patents